J. H. GRAVELL.
METHOD OF WELDING THIN PLATES.
APPLICATION FILED NOV. 23, 1918.
1,308,781.
Patented July 8, 1919.
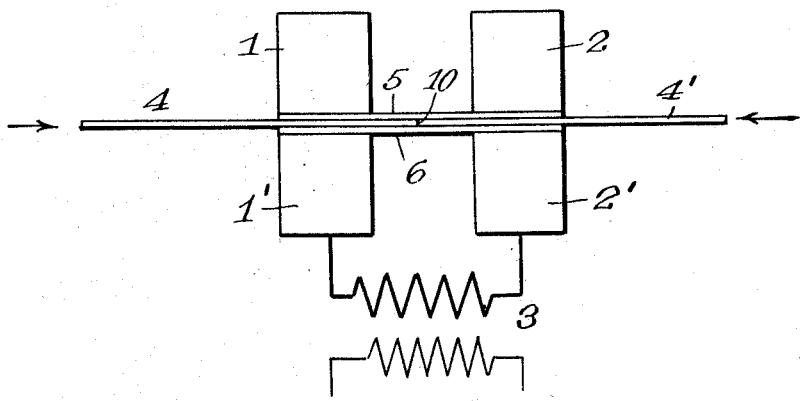
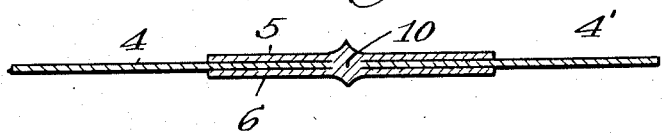
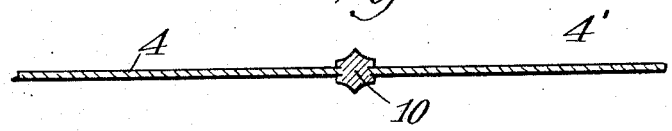
INVENTOR
James H. Gravell
BY
Townsend & Decker
ATTORNEYS ated July 8, 1919.
UNITED STATES PATENT OFFICE.

JAMES H. GRAVELL, OF BROOKLYN, NEW YORK, ASSIGNOR TO THOMSON ELECTRIC WELDING COMPANY, OF LYNN, MASSACHUSETTS, A CORPORATION OF MASSACHUSETTS.

METHOD OF WELDING THIN PLATES.

1,308,781.     Specification of Letters Patent.     Patented July 8, 1919.

Application filed November 23, 1918. Serial No. 263,797.

*To all whom it may concern:*

Be it known that I, JAMES H. GRAVELL, a citizen of the United States, and a resident of Brooklyn, in the county of Kings and State of New York, have invented certain new and useful Improvements in Methods of Welding Thin Plates, of which the following is a specification.

This invention relates to an improvement in the art of butt welding thin plates by means of electric resistance welding, the object being to butt weld thin plates in such manner as to insure a weld of satisfactory appearance and strength.

It is well known in the art that plates of substantial thickness and width, such for example as plates measuring $\frac{1}{4}''$ thick and $5''$ wide may be butt welded in a very satisfactory manner, but where the sheets are very thin and wide, such for example as $1/64''$ thick and $5''$ wide, they are most difficult to butt weld.

This difficulty arises mainly from two causes: First, it is very difficult to bring the two parts to be welded into perfect alinement which of course is necessary in the resistance or Thomson method of butt welding. This results in the edges jumping over each other or lapping and thereby causing a defective weld. Second, it is very difficult to secure a uniform distribution of current throughout the abutting portions. This naturally results in certain parts becoming heated and even overheated before the other parts attain even a red heat.

According to this invention the above difficulties are overcome and a welding of thin sheets is produced as easily and simply as if the sheets had been of substantial thickness.

The method of welding according to this invention is of great utility in the welding of band-saw blades, cutting-rules and in all those cases where it is desirable to secure the parts of thin sheets together and not increase the thickness of the sheet at the joint as is the case in lap welding.

The invention consists in the improved method of joining thin sheets or plates hereinafter more particularly described and then specified in the claims.

In the accompanying drawings, Figure 1 is a diagrammatic view showing the work clamps of an electric welding machine having work assembled in accordance with this invention ready for the welding operation.

Fig. 2 is a longitudinal cross-section through the assembled work after the completion of the welding operation.

Fig. 3 is a similar view after the removal of the greater portion of the clamping plates.

Fig. 4 is an edge view of the finished product.

1, 1' represent the jaws forming one of the clamps of a butt welding machine of any desired construction. 2, 2' represent the jaws of the coöperating clamp. 3 indicates the transformer for passing current through the work by means of the clamps, the clamps forming the terminals of the secondary of the transformer 3 as is well understood in the art.

4, 4' represent two thin pieces of sheet metal to be butt welded together at the joint 10. In order to accomplish this welding I provide two auxiliary sheets or plates of metal 5, 6, one on each of the opposite sides of the work, in the present instance, the sheets 5 and 6.

These auxiliary plates are of sufficient length so as to be engaged and gripped by the clamping jaws and may be of the same or different thickness compared with the sheets 4, 4'. The auxiliary plates 5, 6 should be substantially as wide as the sheets 4, 4' (which may be of any required width) so as to guide and confine the thin sheets across their whole abutting edges. By this arrangement it will be seen that the work to be welded, the sheets 4, 4', is clamped between the auxiliary plates which span the abutted edges of the sheets.

After assembling the sheets and plates as shown in Fig. 1, electric current is passed through the work and the clamping plates from one clamping jaw to the other in the usual manner and when the welding heat is attained the two clamps are forced together in the direction of the arrows. It will be understood that either one or both of the clamping jaws may move in applying the upsetting or welding pressure, all as well understood in the art. This forcing of the clamping jaws toward each other results in the upsetting of the auxiliary plates 5 and 6 and at the same time welding the abutted edges of the sheets 4, 4' together at the joint 10. This operation also welds the auxiliary plates to the work along the joint 10 as shown in Fig. 2.

The auxiliary plates and the sheets are then removed from the clamps after which the plates 5 and 6 are removed from the sheets by scoring and breaking them off close to the joint 10 as shown in Fig. 3. After this, the bur is ground down, if desired, in the regular way producing a perfectly smooth joint as shown in Fig. 4.

The auxiliary plates not only enable a perfect weld to be obtained but by selecting auxiliary pieces of desired composition, the strength of the weld may be regulated at will. If the auxiliary pieces are of high carbon steel the joint will be very hard and brittle even though the plates welded are of soft steel; conversely, when the sheets to be welded are of high carbon steel which naturally produces a very hard and brittle weld, if plates of soft steel are employed the weld will be soft and flexible.

Therefore, according to my invention I have not only provided a method for securing a perfect butt weld between thin plates but at the same time have provided a manner of regulating the quality of the metal at the weld.

What I claim as my invention is:

1. The method of butt-welding thin plates consisting in assembling the plates with their edges abutted between clamping plates, electrically welding the abutted edges and at the same time upsetting the clamping plates.

2. The method of butt-welding thin plates consisting in abutting the edges of the plates, applying clamping plates on opposite surfaces of said plates in position spanning the abutted edges thereof and applying a heating current and pressure whereby the abutted edges are welded and the clamping plates upset in line with the weld.

3. The method of butt-welding thin plates consisting in assembling the plates with their edges abutted between a pair of clamping plates, gripping all said plates in current carrying clamps, passing electric heating current from one clamp to the other and at the same time applying pressure whereby the abutted edges will be welded together and the clamping plates upset in line with the weld.

4. The method of joining thin plates consisting in abutting the edges, assembling the plates between clamping plates spanning the abutted edges, welding the abutted edges and at the same time upsetting the clamping plates in line with the weld and then removing said clamping plates and the upset metal.

5. The method of butt-welding thin sheets consisting in clamping the sheets between two auxiliary plates spanning the abutted edges, heating and upsetting the assembled plates and sheets at the abutted edges of the sheets thereby welding the sheets together and at the same time welding the auxiliary plates to the sheets at the joint.

6. The method of butt-welding thin sheets consisting in clamping the sheets in abutted relation between two metal plates of a composition different than the sheets and welding the sheets together while at the same time causing the plates to commingle with the weld in the sheets.

Signed at New York, in the county of New York, and State of New York, this 19th day of November A. D. 1918.

JAMES H. GRAVELL.

Witnesses:
C. F. TISCHNER,
IRENE LEFKOWITZ.